United States Patent
Ahmad et al.

(10) Patent No.: US 6,917,954 B2
(45) Date of Patent: Jul. 12, 2005

(54) LOAD BALANCING IN IP ADDRESS LOOKUP

(75) Inventors: Imtiaz Ahmad, Brampton (CA); David A. Brown, Carp (CA)

(73) Assignee: Mosaid Technologies, Inc., Kanata (CA)

(*) Notice: Subject to any disclaimer, the term of this patent is extended or adjusted under 35 U.S.C. 154(b) by 411 days.

(21) Appl. No.: 10/132,675

(22) Filed: Apr. 24, 2002

(65) Prior Publication Data

US 2002/0184221 A1 Dec. 5, 2002

Related U.S. Application Data

(60) Provisional application No. 60/294,387, filed on May 30, 2001.

(51) Int. Cl.[7] ............................................. G06F 17/30
(52) U.S. Cl. ......................... 707/205; 707/3; 707/101; 707/102; 709/238; 711/170
(58) Field of Search ................. 707/1–10, 100–104.1, 707/200–206; 709/238–244; 711/117–146, 170–173; 717/162–167, 104

(56) References Cited

U.S. PATENT DOCUMENTS

| | | | |
|---|---|---|---|
| 6,266,706 B1 * | 7/2001 | Brodnik et al. | 709/242 |
| 6,539,369 B2 * | 3/2003 | Brown | 707/1 |
| 6,691,218 B2 * | 2/2004 | Brown | 711/216 |

FOREIGN PATENT DOCUMENTS

| | | |
|---|---|---|
| WO | WO99/13619 | 3/1999 |
| WO | WO 99/14906 | 3/1999 |

OTHER PUBLICATIONS

Degermark Mikael et al., "Small Forwarding Tables for Fast Routing Lookups", Department of Computer Science and Electrical Engineering, Luleå University of Technology, Sweden, *SigComm '97 Cannes*, France pp. 3–14 (1997).

Gupta, P., et al., "Routing Lookups in Hardware at Memory Access Speeds," *INFOCOM '98, IEEE*.

Ruiz–Sanchez, M. A., et al., "XP002901792 Survey and Taxonomy of IP Address Lookup Algorithms," *IEEE Network*, (Mar./Apr. 2001).

Yu, D., et al., "XP–001016965 Forwarding Engine for Fast Routing Lookups and Updates," *IEEE* (1999).

\* cited by examiner

*Primary Examiner*—Jean M. Corrielus
*Assistant Examiner*—Joon Hwan Hwang
(74) *Attorney, Agent, or Firm*—Hamilton, Brook, Smith & Reynolds, P.C.

(57) ABSTRACT

A load balancing mechanism maps a binary tree representation of a routing table into a set of fixed size memories. The mechanism efficiently utilizes the memory in the routing table without violating the tree precedence constraints and the memory access requirements of a pipelined system. The mechanism stores a subtree associated with a densely populated level of the binary tree in memory associated with lower levels.

20 Claims, 6 Drawing Sheets

|         | t1    | t2    | t3    | t4    | t5    | t6    |
|---------|-------|-------|-------|-------|-------|-------|
| LEVEL 1 | KEY 1 | KEY 2 | KEY 3 | KEY 4 | KEY 5 | KEY 6 |
| LEVEL 2 |       | KEY 1 | KEY 2 | KEY 3 | KEY 4 | KEY 5 |
| LEVEL 3 |       |       | KEY 1 | KEY 2 | KEY 3 | KEY 4 |
| LEVEL 4 |       |       |       | SKIP  | KEY 2 | KEY 3 |
| LEVEL 5 |       |       |       |       | KEY 1 | KEY 2 |

FIG. 6

LOAD BALANCING IN IP ADDRESS LOOKUP

RELATED APPLICATION

This application claims the benefit of U.S. Provisional Application No. 60/294,387, filed on May 30, 2001. The entire teachings of the above application is incorporated herein by reference.

BACKGROUND OF THE INVENTION

The Internet is a set of networks connected by routers. A router maintains a routing table that indicates for each possible destination network, the next hop to which a received data packet should be forwarded. The next hop may be another router or the final destination.

An Internet Protocol ("IP") data packet received at a port in a router includes an IP destination address. The IP destination address is the final destination of the IP data packet. Currently there are two versions of IP, IP version 4 ("IPv4") and IP version 6 ("IPv6"). IPv4 provides a 32-bit field in an IP header included in the data packet for storing the IP destination address. The router forwards a received data packet to a next-hop router or the final destination if the destination is the local network, dependent on the IP destination address stored in the IP header.

A 32-bit IPv4 destination address provides 4 billion possible routes. An Internet router typically stores 50,000 of the 4 billion possible routes. However, the number of stored routes will increase with the growth of the Internet and the widespread use of IPv6.

Originally, the IP address space was divided into three classes of IP addresses; A, B and C. Each IP address space was divided into a network address and a host address. Class A allowed for 126 networks and 16 million hosts per network. Class B allowed for 16382 networks with 64,000 hosts per network and class C allowed for 2 million networks with 256 hosts per network. However, dividing the IP address space into different classes reduced the number of available IP addresses. Class C only allowed a maximum of 256 hosts per network which is too small for most organizations. Therefore, most organizations were assigned a Class B address, taking up 64,000 host addresses which could not be used by other organizations even if they were not used by the organization to which they were assigned. Hosts in an organization with a Class B IP address all store the same network address in the 16 Most Significant Bits ("MSBs"), for example, 128.32.xx.xx.

Classless InterDomain Routing ("CIDR") was introduced to free up unused IP host addresses. The remaining unused networks are allocated to organizations in variable sized blocks. An organization requiring 500 addresses gets 500 continuous addresses. For example, an organization can be assigned 500 available addresses starting at 128.32.xx. The number of routes stored by a router has increased since the introduction of Classless InterDomain Routing. Classless InterDomain Routing requires longest prefix matching instead of searching for a matching network address in order to find the corresponding next hop for the IP destination address. For example, a search can no longer stop after the 16 MSBs of a Class B IP address, for example, 128.xx.xx because 128.32.4.xx may be assigned to another organization requiring a different next hop.

One method for searching for a longest prefix match for a key is through the use of a binary tree search. A binary tree search matches a 32-bit input bit by bit down to 32 levels, requiring 32 searches to find the entry matching the 32-bit key. Another method for searching for a match is through the use of a Patricia tree. A Patricia tree reduces the number of searches required if there are no entries down a leaf of the binary tree.

Yet another method for efficiently searching for a next hop associated with an IP destination address is described in PCT application Serial Number PCT/SE98/00854 entitled "Method and System for Fast Routing Lookups" by Brodnick et al. filed on May 11, 1998. The method described by Brodnick reduces the number of next hops stored by not storing duplicate routes. By reducing the number of next hops, the memory requirement is reduced so that a route lookup table can be stored in fast cache memory.

Brodnick et al. divides the 32-bit binary tree into 3-levels. Dividing the 32-bit binary tree into 3-levels reduces the number of searches to three. The indexed entry in the first level indicates whether the search can end at the first level with the route taken from the entry, or the search must continue to a subsequent level using a further portion of the IP destination address.

FIG. 1A illustrates a prior art 64K (65536) bit map representing the first level of a binary tree. A 64K bit map 30 represents the leaves or nodes 44 of the binary tree at depth 16, with one bit per node 44. The bit map is divided into bit-masks of length 16. There are $2^{12}$=4096 bit masks in the 64k bit map. One bit mask is shown in FIG. 1A. A bit in the bit map 30 is set to '1' if there is a subtree or a route index stored in an array of pointers corresponding to the node 44. A bit in the bit map 30 is set to '0' if the node shares a route entry with a previous node 44.

FIG. 1B illustrates a prior art lookup table implemented in cache memory. The lookup table includes an array of code words 36, an array of base indices 34 and a map table 40. A 32-bit IP address 38 is also shown in FIG. 1B. A codeword 46 is stored in the array of code words 36 for each bit mask in the bit map 30 (FIG. 1A). The code word 46 includes a six-bit value 46a and a 10-bit offset 46b. A base index 42 is stored in the array of base indices 34 for every four code words 46 in the array of code words 36.

The array of code words 36, array of base indices 34 and map table 40 are used to select a pointer in an array of pointers (not shown). The pointer stores a route index or an index to perform a further search.

A group of pointers in the array of pointers is selected by selecting a code word 46 in the array of code words 36 and a base index 42 in the array of base indices 34. The code word 46 is selected using the first 12 bits 50 of the IP address 38. The base index 42 is selected using the first 10 bits 48 of the IP address 38. The correct pointer in the group of pointers is selected using the map table 32.

The 10-bit value 46b in the selected code word 36 is an index into the map table 32. The map table 32 maps bit numbers within a bit-mask to 4-bit offsets. The offset specifies the pointer within the selected group of pointers in the array of pointers. The 10-bit value 46b selects the row in the map table 32 and bits 19:16 of the IP address 52 selects the 4-bit offset 54.

Thus, a search for a pointer requires the following cache memory accesses: (1) read a 16 bit code word 46; (2) read a 16-bit base address 42; (3) read a 4 bit offset 54 from the map table 32; (4) read a pointer at a pointer index where the pointer index is the sum of the base address 42, the code word offset 46a and the 4-bit offset 54.

The same memory accesses are required for each level of the binary tree. Thus, a search of three levels requires 12 memory accesses.

SUMMARY OF THE INVENTION

U.S. patent application Ser. No. 09/733,627 filed on Dec. 8, 2000 describes a method and apparatus for storing a route for an Internet Protocol ("IP") address in a multi-level lookup table. A multi-level search is performed, based on a single search request, to find a route index stored in a mapper in the lookup table which indexes a range of IP addresses associated with a range of leaves of a subtree. As new routes are learned, the lookup table is updated to add new route indexes.

The multi-level lookup table includes a plurality of fixed size memories, with each memory associated with one level of the tree. The binary tree is mapped into the fixed size memories such that each node (route index or subtree index) is mapped into only one memory. The multi-level search performs a longest prefix search for a search key in the plurality of memories starting at the first memory and successively searching a next memory based on the result of the search of the previous level memory and a next portion of the search key. By providing one memory per level, multiple searches for different search keys can be performed in parallel. To avoid a memory access conflict, predecessor and successor nodes are not mapped into the same memory and nodes for each level are stored in the respective level memory.

Some of the levels of the binary tree may be sparsely populated and other levels may be densely populated resulting in uneven distribution of routes stored in the table. For example, in existing Internet Routing Tables, the majority of routes for a 32-bit IP address have a longest match prefix address of 24 bits resulting in the majority of routes being stored in one of the memories. If the fixed size memory associated with a level is full, no further routes associated with the level can be stored in the lookup table.

The number of routes stored in a multi-level lookup table having a plurality of memories is increased by storing the route in a memory associated with a lower level of the binary tree.

A multi-level lookup table includes a plurality of memories storing a binary tree representation of a routing table. Each memory is associated with one level of the binary tree. The multi-level lookup table also includes logic which allows a subtree associated with a densely populated level of the binary tree to be stored in a lower level memory associated with a lower level of the binary tree to increase the number of locations for storing routes for the densely populated level.

A skip indicator is stored with a subtree index to the subtree in memory associated with a higher level of the binary tree. The skip indicator provides an indication to the logic whether the subtree is stored in the memory associated with densely populated level. The skip indicator can be a single bit or a plurality of bits stored in a mapper entry.

The subtree associated with a densely populated level of the binary tree may be stored in the memory associated with the lower level in the binary tree, upon detecting the number of routes stored in the memory associated with the densely populated tree is greater than a predetermined threshold.

The subtree associated with a densely populated level of the binary tree stored in a lower level memory associated with the lower level of the binary tree may be moved to the memory associated with the densely populated level, upon inserting a subtree index to the subtree.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 6 illustrates parallel multi-level searches of the lookup table shown in FIG. 3.

DETAILED DESCRIPTION OF THE INVENTION

A description of preferred embodiments of the invention follows.

Figure 1A:
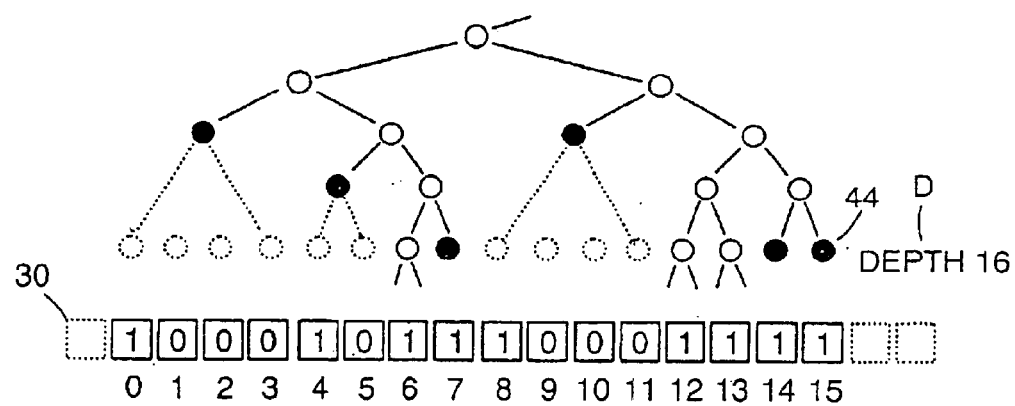
FIG. 1A illustrates a prior art 64K (65536) bit map representing the first level of a binary tree.
Figure 1B:
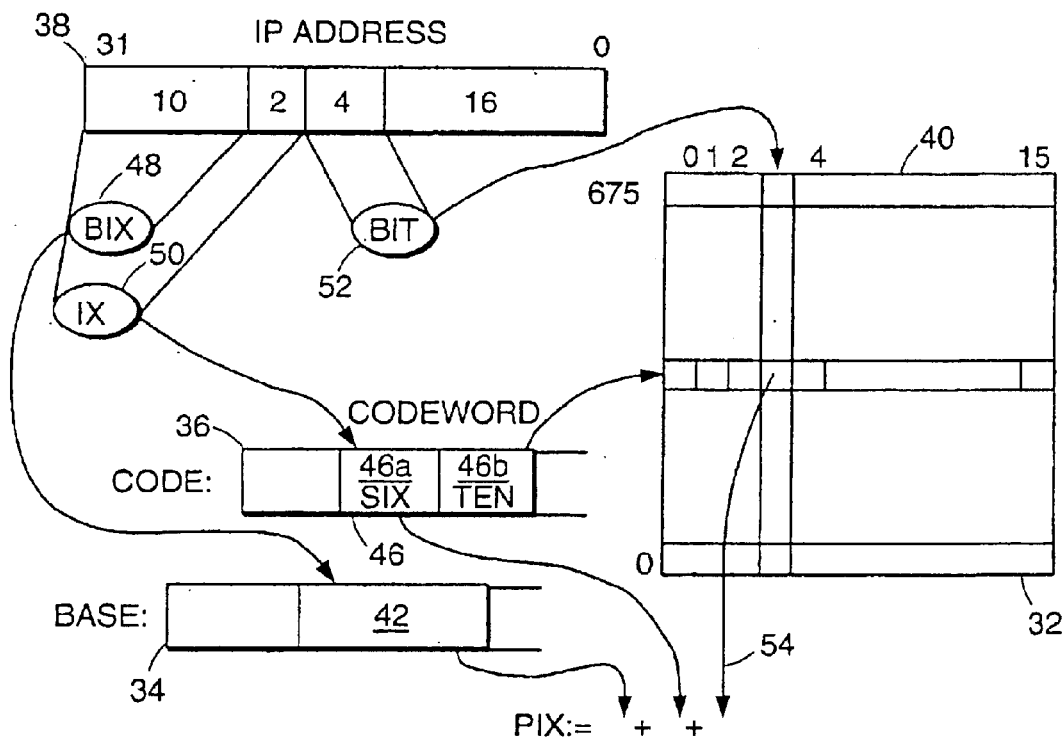
FIG. 1B illustrates a prior art lookup table implemented in cache memory.
Figure 2:
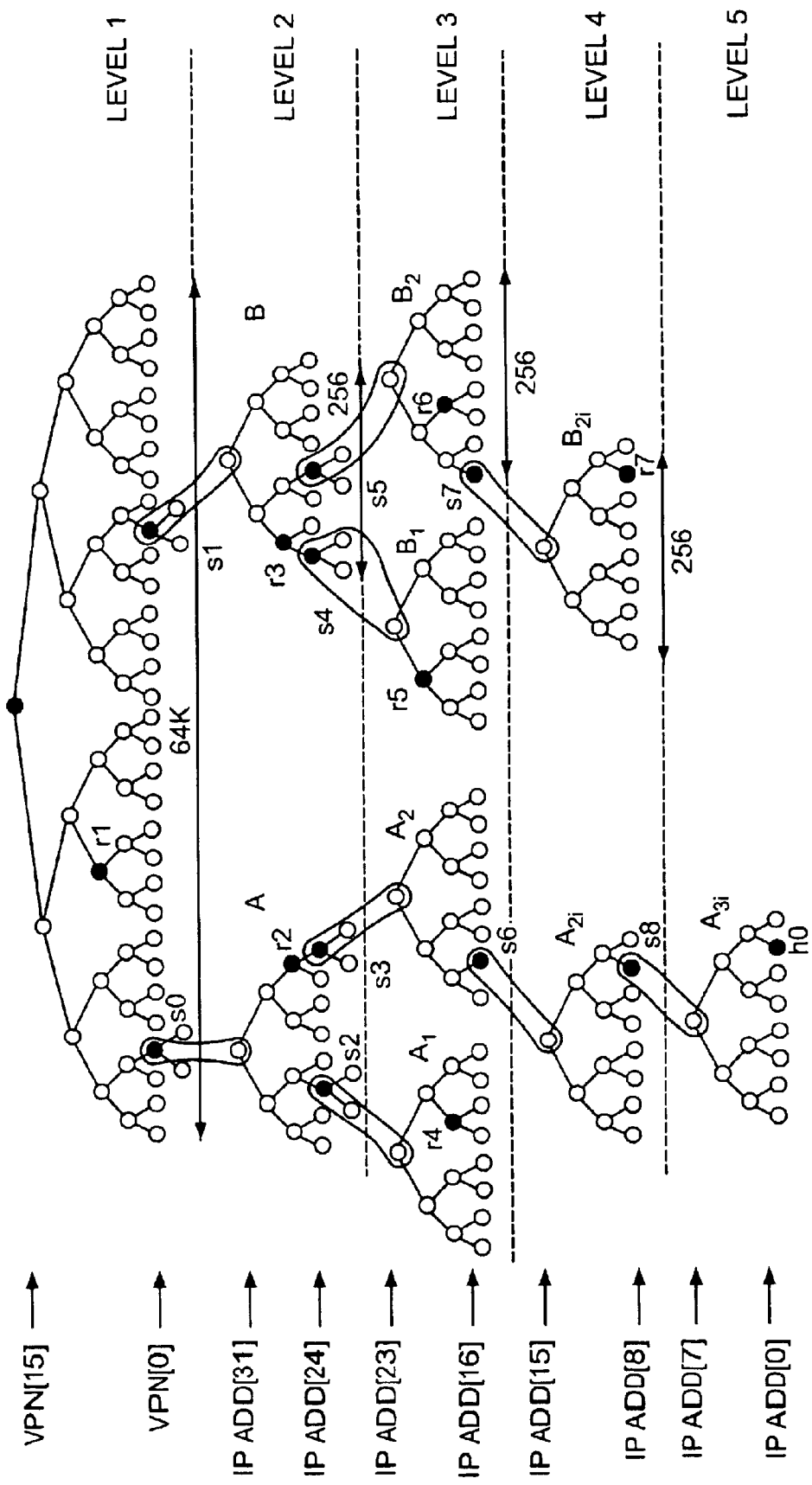
FIG. 2 is a binary tree representation of a lookup table including routes and subtree indexes for a 48 bit search key.

FIG. 2 is a binary tree representation of a multi-level lookup table having a 48 bit search key. The binary tree has five levels with level 1 including the most significant 16-bits of the 48-bit search key and levels 2–5 each including a respective next 8 bits of the 48-bit search key. For illustrative purposes, only the first 5-bits of the 16-bits of level 1 and the first 3 bits of the 8-bits of levels 2–5 are shown.

As shown, level 1 of the binary tree has one route index (r1) and two subtree pointers (s0, s1) to respective subtrees (A, B). A search of level 1 based on the first 16 bits of the 48-bit search key results in route index r1 or subtree pointers s0, s1. Level 2 has two route indexes (r2, r3) and four subtree pointers (s2, s3, s4, s5) to respective subtrees ($A_1$, $A_2$, $B_1$, $B_2$) in level 3. Level 3 has three route indexes (r4, r5, r6) and two subtree pointers (s6, s7) to respective subtrees ($A_{2i}$, $B_{2i}$,) in level 4. Level 4 has one route index r7 and one subtree pointer (s8) to subtree $A_{3i}$ in level 5. Level 5 has one host node h0.

With 16-bits, level 1 of the binary tree can have $2^{16}$ (64 k) possible route indexes or subtree pointers. The number of possible routes or subtree pointers increases in each subsequent lower level of the binary tree. For example, there are ($2^{16} \times 2^8 = 2^{24}$ (16M)) possible route indexes or subtree pointers in level 2 and ($2^{24} \times 2^8 = 2^{32}$ (4G)) possible route indexes or subtree pointers in level 3. An extremely large memory is required to provide storage for all possible route indexes or subtree indexes. However, only a small portion of the possible routes are stored.

Figure 3:
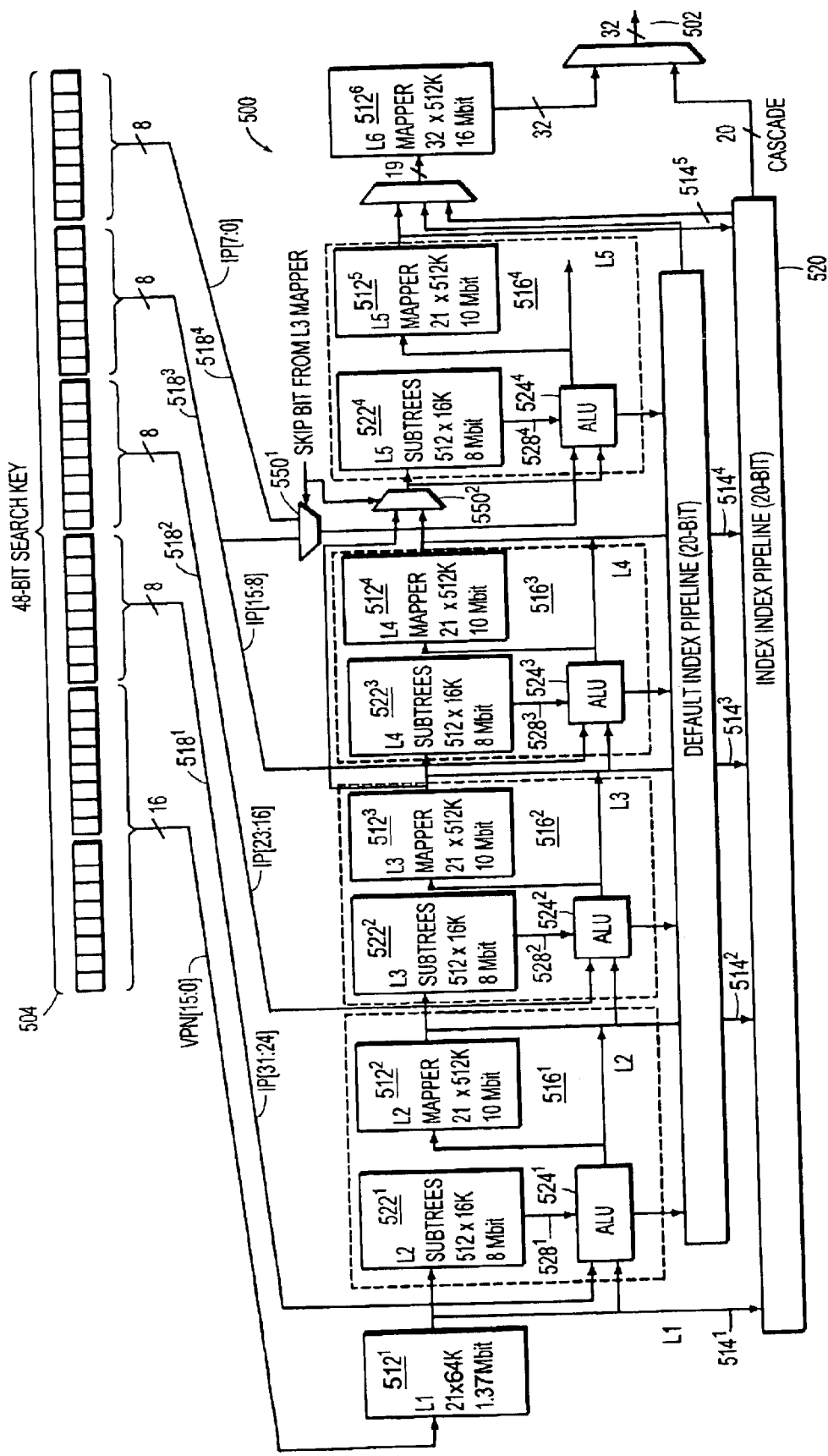
FIG. 3 is a block diagram of a multi-level lookup table including a plurality of fixed size memories storing routes and subtrees shown in the binary tree representation in FIG. 2 according to the principles of the present invention.

FIG. 3 is a block diagram of a multi-level forwarding table including a plurality of level memories $512^1$, $516^1$-$516^4$ storing the binary tree representation shown in FIG. 2 according to the principles of the present invention. Nodes in the binary tree are mapped to the level memories such that, nodes in the same level of the binary tree are stored in the same level memory. This mapping scheme allows a plurality of multilevel searches to be performed in parallel in the lookup table.

Only the data path in the lookup table is shown. The lookup table also includes a control unit. The control unit issues memory control signals for example, a read control signal. A multi-level search is performed in the lookup table to find a route index corresponding to a search key. The search begins in level 1 memory $512^1$. The result of the search in each level memory indicates whether a further search is required in the next level memory. Each level memory $512^1$, $516^1$-$516^4$ stores all route indexes and subtree pointers for the respective level of the binary tree.

In one embodiment, the level 1 memory $512^1$ includes a location for each of the 64K nodes in the first level of the binary tree. All of the other level memories $516^1$-$516^4$ provide storage for 16K subtree descriptors and 512K route indexes or subtree pointers. Thus, only 512K of the 4G possible route indexes or subtree pointers in level 3 of the binary tree can be stored in level 3 memory $516^2$.

Level 1 memory $512^1$ stores all route indexes (r1) and subtree pointers (s0, s1) corresponding to level 1 of the binary tree. Level 2 memory $516^1$ stores all route indexes for subtrees A and B corresponding to level 2 of the binary tree. Level 3 memory $516^2$ stores all route indexes and subtree points for subtrees $A_1$, $A_2$, B, and $B_2$ corresponding to level 3 of the binary tree.

As shown in FIG. 2, level 1 is the highest level of the subtree and level 5 is the lowest level. If level 3 memory $516^2$ is full, subtrees $A_1$ and $B_1$ cannot be stored in a higher level memory, for example, level 1 memory $512^1$ or level 2 memory $516^1$ because it would violate tree precedence constraints. Subtrees $A_1$ and $B_1$ do not require further search in a lower level because they do not include any subtree pointers. Thus, tree precedence constraints are not violated if subtrees $A_1$ and $B_1$ are stored in a lower level memory. Thus, subtrees $A_1$ and $B_1$ can be stored in the level memory $516^3$. If level 4 memory $516^3$ is full, subtree $B_{2i}$ can be stored in level 5 memory $516^4$ because subtree $B_{2i}$ does not include any subtree pointers to subtrees in level 5 of the binary tree. By storing a subtree associated with a level in the binary tree in a memory associated with a lower level in the binary tree, the number of available locations for storing routes in a lookup table is increased.

If subtree $B_{2i}$ is stored in level 5 memory $516^4$, a skip indicator stored with subtree pointer s7 in level 3 memory $516^2$ indicates that the subtree pointer points to a subtree stored in level 5 memory. Level 4 memory is not to be searched, i.e., a search in level 4 memory is skipped because subtree $B_{2i}$ is stored in level 5 memory $516^4$ instead of level 4 memory $516^3$. Thus, no search is performed in the level 4 memory search cycle for the search key. Instead, the level 4 search is performed in the level 5 search cycle. Tree precedence constraints are not violated because level 5 memory $516^4$ is searched after level 4 memory $516^3$ and subtree $B_{2i}$ does not have any subtree pointers requiring a further level 5 search cycle for the search key.

The multi-level lookup table 500 provides a final route index 502 for a key 504. In the embodiment shown, the key 504 is 48 bits wide and includes a 32-bit Internet Protocol Version 4 ("IPv4") address and a 16-bit route table index (VPN). The first 16-bits of the 48-bit key 504 are coupled to the L1 mapper $512^1$ to search for a route index corresponding to the first 16-bits of the 48-bit key 504 or a pointer to a subtree stored in the next level mapper $516^1$ to continue the search down the tree.

A search is performed in each level memory $516^1$-$516^4$ for a route index or subtree index corresponding to the result of the search of the previous respective mapper level $514^1$-$514^4$ and a next 8-bits of the 48-bit key $518^1$-$518^4$. The result of the search of the respective mapper level $514^1$-$514^5$ is forwarded to a pipeline 520. The result of the search of the multi-level lookup table 500 for a route corresponding to the 48-bit key 604 is output as the final index 502.

Each level memory $516^1$-$516^4$ includes a respective subtree memory $522^1$-$522^4$, a mapper $512^2$-$512^5$ and an Arithmetic Logical Unit ("ALU") $524^1$-$524^4$. The subtree memory $522^1$-$522^4$ stores a subtree descriptor per subtree stored in the level. The mapper $512^2$-$512^5$ stores route indexes and subtree indexes for nodes in subtrees stored in the respective subtree memory $522^1$-$522^4$. The ALU generates a mapper index dependent on the result of the search of the upper level $514^1$-$514^4$, the next 8 bits of the key $518^1$-$518^4$ and the selected subtree descriptor $528^1$-$528^4$.

Each subtree memory $522^1$-$522^4$ can store dense subtree descriptors and sparse subtree descriptors. If the subtree has less than sixteen routes or subtree indexes, a sparse subtree descriptor is stored for a subtree. If the subtree has at least 16 routes or subtree indexes, a dense subtree descriptor is stored for a subtree. Dense subtree descriptors and sparse subtree descriptors are described in co-pending U.S. patent application Ser. No. 09/733,627 filed Dec. 8, 2000 entitled "Method And Apparatus For Longest Match Address Lookup" by David A. Brown the contents of which are incorporated herein by reference in its entirety.

Figure 4:
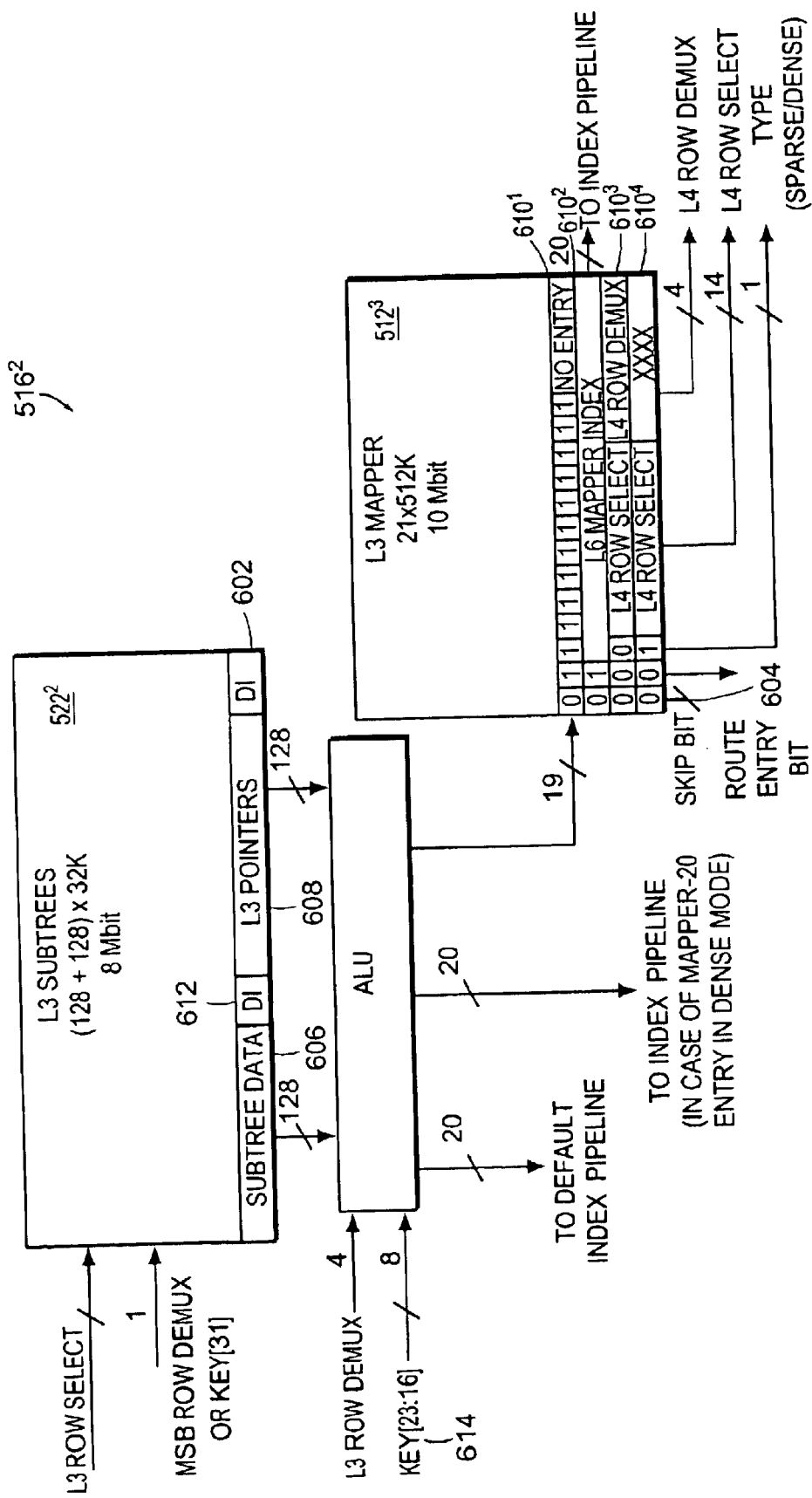
FIG. 4 is a block diagram of the level 3 memory in the lookup table shown in FIG. 3.

FIG. 4 is a block diagram of the level 3 memory $516^2$ in the multi-level lookup table 500 shown in FIG. 3. The L3 memory $516^2$ includes L3 subtree memory $522^2$ and an L3 mapper $512^3$. The width of each entry in the L3 mapper $512^3$ is 21-bits. The L3 mapper 512 stores mapper entries $610^1$-$610^4$ corresponding to nodes in a subtree identified by a subtree descriptor 602 stored in the L3 subtree memory $522^2$. A mapper entry can store a no-entry $610^1$, a route index $610^2$ or a subtree index $610^3$. A route index is a pointer to a location in another memory storing the route. In an alternative embodiment the actual route can be stored in the mapper entry instead of a pointer route index. A subtree index is a pointer to a subtree descriptor stored in subtree memory in the next level mapper.

If the selected mapper entry 610 in the L3 mapper $512^3$ stores a subtree index $610^4$, $610^3$, the data stored in the mapper entry is forwarded as the result of the search of level 3 to the level 4 memory $516^3$ and to the pipeline 520 (FIG. 3). If the selected mapper entry 610 stores a route index $610^2$, the data stored in the mapper entry is an index for the last memory mapper (L6). The L6 mapper stores 32 bit associated data to be returned for the route index.

Each mapper entry 610 includes a skip indicator 604, the state of which indicates whether the next lower level memory should be searched in the next level search cycle for a route corresponding to the key 504. In one embodiment, the skip indicator is one bit which is set to '1' to skip a search of the next level memory. Instead of performing the next level search in the next level memory, the search of the next level memory is skipped and the multi-level search for a route corresponding to the key continues in the next lower level search cycle in the next lower level memory.

The subtree index forwarded from the second level memory $516^1$ selects a subtree entry 602 in the subtree memory $522^2$. The subtree entry 602 includes subtree data 606, subtree pointers 608 and a default index 612. The next 8-bits of the search key [23:16] 614 and a portion of the subtree index from the level 2 memory $516^1$ together with the subtree entry 602 select a mapper entry 610 in the L3 mapper memory $512^3$ corresponding to the selected node in the selected subtree in level 3 as shown in FIG. 2.

The skip indicator 604 in the mapper entry 610 allows distribution of subtrees among memory associated with different levels of the subtree increasing the number of routes stored in the lookup table without violating tree precedence constraints. Returning to FIG. 3, routes corresponding to the longest prefix searches for keys mapping to the level 4 memory $516^3$ can be distributed between level 4 memory $516^3$ and level 5 memory $516^4$. Two multiplexers $550^1$, $550^2$ allow L4 subtrees and associated routes to be stored in either the level 4 memory $516^3$ or the level 5 memory $516^4$. The level 4 memory $516^3$ is skipped and the subtree index stored in the L3 mapper $512^3$ is forwarded directly to the L5 subtree memory $522^4$. The skip indicator from the selected mapper entry in the L3 mapper memory $512^3$ controls the multiplexers $550^1$, $550^2$.

To skip the search of the L4 memory $516^3$, the skip indicator 604 in the L3 mapper entry is set to '1' and the 8 bits of the next portion of the search key are directed to the level 5 memory $516^4$ instead of the level 4 memory $516^3$. The subtree index stored in the L3 mapper memory entry is a pointer to a subtree stored in the L5 memory and is forwarded directly to the level 5 memory. Thus, a subtree with no subtree pointers associated with level 4 of the binary tree can be stored in the level 5 memory $516^4$ and accessed as if it were stored in the level 4 memory $516^3$ without violating the tree precedence constraints. All routes for a particular subtree are stored in the same level memory. Thus, subtrees associated with level 4 with no subtree pointers can be stored in the level 5 memory $516^4$ instead of the level 4 memory $516^3$. However, only subtrees that do not require a further search in L5 memory can be moved to L5 memory; that is, subtrees with no subtree pointers to subtrees in a lower level of the binary tree.

Figure 5:
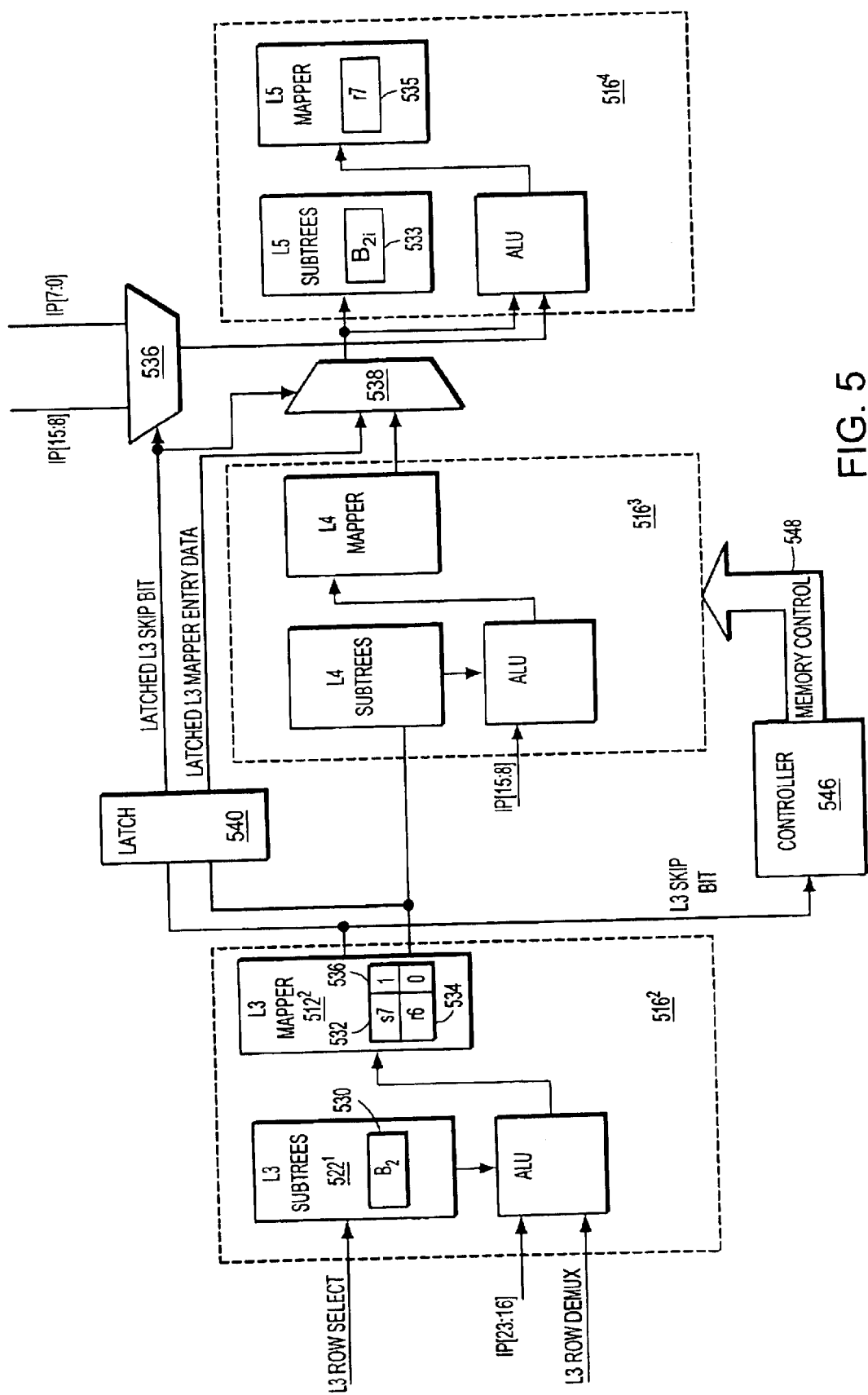
FIG. 5 is a block diagram illustrating a level 4 subtree stored in level 5 memory.

FIG. 5 is a block diagram illustrating the level 4 subtree $B_{2i}$ stored in level 5 memory $516^4$. FIG. 5 is described in conjunction with FIG. 3. As shown in FIG. 2, route r6 and subtree s7 are nodes in subtree $B_2$ in level 3 of the binary tree. Returning to FIG. 5, level 3 memory $516^2$ stores a subtree descriptor 530 for subtree $B_2$ in L3 subtree memory $522^1$. The subtree descriptor 530 together with the next portion of the search key IP[23:16] selects subtree pointer s7 to subtree $B_{2i}$ in level 4 of the binary tree or the route index r6 stored in L3 mapper memory $512^2$.

The skip indicator 536 is set '1' in the mapper entry for subtree pointer s7 indicating that a search of level 4 memory $516^3$ is to be skipped because the subtree descriptor for $B_{2i}$ 533 is stored in level 5 memory $516^4$. The L3 mapper entry data including the L3 skip indicator is stored in latch 540 for one level search cycle; that is, the search cycle for the L4 level memory. In the level 5 search cycle, the L3 mapper entry data for the search of L5 memory is provided at the input to L5 memory by multiplexer 538. The output of the L3 memory is stored for one level search cycle so that the subtree pointer from the L3 memory $512^2$ and the key to be searched are provided to the input of the L5 memory $512^3$ in the L5 search cycle for the search key. The stored L3 skip indicator is coupled to 2:1 multiplexer 536 to select the next portion of the key to be forwarded to level 5 memory $516^4$.

If the skip indicator is '1', IP[15:8] is selected as the next portion of the key; that is, the portion associated with level 4 of the binary tree. If the skip indicator is '0', IP[7:0] is selected as the next portion of the key; that is, the portion associated with level 5 of the binary tree.

Multiplexer 538 forwards the subtree pointer to select the subtree descriptor dependent on the state of the L3 skip indicator. The subtree pointer is the subtree pointer stored in L3 memory $516^2$ or stored in L4 memory $516^3$ dependent on the state of the L3 skip indicator. The L3 skip indicator is coupled to controller 546. Controller 546 controls memory access to memory in level 4 memory $516^3$. Upon detecting the L3 skip indicator set '1' indicating a search of L4 memory $516^3$ is to be skipped, the controller 546 does not issue a memory read command on the memory control signals 548 for the level search cycle. Thus, the search of L4 memory $516^3$ is skipped.

FIG. 6 illustrates parallel multi-level searches of the lookup table shown in FIG. 3. A search for a longest prefix match for a search key commences in level 1 memory $512^1$ and continues in the level 2 memory $516^1$ based on the result of the search of the level 1 search and the next portion of the search key 504. Subsequent searches in level 3 memory $516^2$, level 4 memory $516^3$ and level 5 memory $516^4$ are performed based on the result of the search of the previous level search and the next portion of the search key. A multi-level search for another search key can begin each time period t. As shown, a search for key 1 commences in level 1 memory 512 in time period t1, and a search for key 2 in level 1 memory 512 begins in time period t2. Thus, multiple multilevel searches can be performed in parallel in the lookup table.

In the embodiment shown, a search of level 4 of the tree is skipped if the subtree is stored in L5. The skip indicator allows L4 subtrees to be stored in both the level 4 memory and the level 5 memory to increase the number of available locations for storing routes associated with level 4. However, the invention is not limited to distributing routes for a particular level between two level memories. For example, routes for a particular level can be distributed among a plurality of lower levels by increasing the number of bits in the skip indicator in the mapper entry.

A subtree can be moved to a memory associated with a lower level of the tree only if all routes for the subtree can be stored in the memory; that is, there can be no further search in a level memory associated with a lower level in the tree. Thus, only subtrees including final routes can be moved to a lower level memory. The subtree can not include a pointer to a subtree. Routes can be redistributed by moving subtrees to the lower level memory to provide locations associated with each level for storing new routes. In one embodiment, redistribution of subtrees is performed when adding a route to a subtree in a level by replacing a pointer to another subtree storing the route. In another embodiment subtrees are redistributed when the number of available locations falls below a predetermined threshold. In yet another embodiment, subtrees are redistributed only upon detecting no available location for storing a new route in the memory associated with the level of the route.

While this invention has been particularly shown and described with references to preferred embodiments thereof, it will be understood by those skilled in the art that various changes in form and details may be made therein without departing from the scope of the invention encompassed by the appended claims.

What is claimed is:

1. A multi-level lookup table comprising:
   a plurality of memories, a binary tree representation of a routing table mapped into the memories, with each memory associated with one level of the binary tree; and
   logic which allows storage of a subtree that includes final routes and is associated with a densely populated level of the binary tree in a memory associated with a level lower than the densely populated level of the binary tree to increase the number of locations for storing routes for the densely populated level.

2. The multi-level lookup table as claimed in claim 1 further comprising:

a skip indicator stored with a subtree index to the subtree in memory associated with a higher level of the binary tree, the skip indicator indicating to the logic whether the subtree is stored in the memory associated with the densely populated level.

3. The multi-level lookup table as claimed in claim 2 wherein the skip indicator is a single bit stored in a mapper entry.

4. The multi-level lookup table as claimed in claim 2 wherein the skip indicator is a plurality of bits stored in a mapper entry.

5. The multi-level lookup table as claimed in claim 1 wherein the subtree associated with a densely populated level of the binary tree is stored in the memory associated with the lower level in the binary tree, upon detecting the number of routes stored in the memory associated with the densely populated tree is greater than a predetermined threshold.

6. The multi-level lookup table as claimed in claim 1 wherein the subtree associated with a densely populated level of the binary tree stored in a lower level memory associated with the lower level of the binary tree is moved to the memory associated with the densely populated level, upon inserting a subtree index to the subtree.

7. A method for increasing a number of routes stored in a multi-level lookup table comprising the steps of:

mapping a binary tree representation of a routing table into a plurality of memories, each memory associated with one level of the binary tree; and storing a subtree that includes final routes and is associated with a densely populated level of the binary tree in a memory associated with the level of the binary tree lower than the densely populated level to increase the number of locations for storing routes for the densely populated level.

8. The method as claimed in claim 7 further comprising the step of:

storing a skip indicator with a subtree index to the subtree, the skip indicator indicating whether the subtree is stored in the memory associated with the densely populated level.

9. The method as claimed in claim 8 further comprising the step of:

skipping a search of the densely populated level dependent on the skip indicator.

10. The method as claimed in claim 9 further comprising the step of:

after skipping the search of the densely populated level, continuing the search in the memory associated with the level of the binary tree lower than the densely populated level.

11. The method as claimed in claim 8 wherein the skip indicator is a single bit stored in a mapper entry.

12. The method as claimed in claim 8 wherein the skip indicator is a plurality of bits stored in a mapper entry.

13. The method as claimed in claim 7 further comprising the step of:

moving the subtree associated with a densely populated level of the binary tree to a lower level memory associated with the lower level in the binary tree, upon detecting the number of routes stored in the memory associated with the densely populated tree is greater than a predetermined threshold.

14. The method as claimed in claim 7 further comprising the steps of:

moving the subtree associated with a densely populated level of the binary tree stored in a lower level memory associated with the lower level in the binary tree to the memory associated with the densely populated level, upon inserting a subtree index to the subtree.

15. A multi-level lookup table comprising:

a plurality of memories, a binary tree representation of a routing table mapped into the memories, with each memory associated with one level of the binary tree; and logic means for storing a subtree that includes final routes and is associated with a densely populated level of the binary tree in a lower level memory associated with the lower level of the binary tree to increase the number of locations for storing routes for the densely populated level.

16. The multi-level lookup table as claimed in claim 15 further comprising:

a skip indicator stored with a subtree index to the subtree, the skip indicator indicating whether the subtree is stored in the memory associated with the densely populated level.

17. The multi-level lookup table as claimed in claim 16 wherein the skip indicator is a single bit stored in a mapper entry.

18. The multi-level lookup table as claimed in claim 16 wherein the skip indicator is a plurality of bits stored in a mapper entry.

19. The multi-level lookup table as claimed in claim 15 wherein the subtree associated with a densely populated level of the binary tree is moved to a lower level memory associated with the lower level in the binary tree, upon detecting the number of routes stored in the memory associated with the densely populated tree is greater than a predetermined threshold.

20. The multi-level lookup table as claimed in claim 15 wherein the subtree associated with a densely populated level of the binary tree stored in a lower level memory associated with the lower level in the binary tree is moved to the memory associated with the densely populated level, upon inserting a subtree index to the subtree.

* * * * *